United States Patent [19]

Nagamura

[11] 3,988,025

[45] Oct. 26, 1976

[54] RECORD DISC CUTTING APPARATUS

[76] Inventor: Fumitaka Nagamura, 1-6-14, Tomigaya, Shibuya, Tokyo, Japan

[22] Filed: Feb. 13, 1975

[21] Appl. No.: 549,502

[52] U.S. Cl. .......................... 274/37; 179/100.4 ST; 179/100.4 C; 179/100.41 K; 274/46 R

[51] Int. Cl.[2] ............................................ G11B 3/44

[58] Field of Search ........... 274/37, 38, 46 R, 46 A, 274/46 B, 46 C, 46 D; 179/100.4 ST, 100.4 C, 100.41 K

[56] References Cited

UNITED STATES PATENTS

| | | | |
|---|---|---|---|
| 2,114,471 | 4/1938 | Keller et al. | 179/100.4 C |
| 2,980,428 | 4/1961 | Blashewski | 274/37 |
| 3,118,977 | 1/1964 | Olson | 179/100.4 ST |
| 3,136,555 | 6/1964 | DeVries | 274/37 |
| 3,490,771 | 1/1970 | Bauer | 179/100.4 C |
| 3,514,550 | 5/1970 | DeVries | 274/37 |
| 3,686,471 | 8/1972 | Takahashi | 179/100.4 ST |
| 3,687,461 | 8/1972 | Kamiya | 274/38 |

FOREIGN PATENTS OR APPLICATIONS

| | | | |
|---|---|---|---|
| 685,335 | 12/1952 | United Kingdom | 274/37 |
| 920,441 | 3/1963 | United Kingdom | 274/37 |

*Primary Examiner*—Richard E. Aegerter
*Attorney, Agent, or Firm*—Wallenstein, Spangenberg, Hattis & Strampel

[57] ABSTRACT

A record disc cutting apparatus is disclosed wherein cutting vectors are three-dimentionally distributed. The cutter head is cantilevered by a unique support structure. The support structure provides various fulcrum positions therealong for cutter head pivotal motions in response to the driving directions by means of a 45—45 drive mechanism.

1 Claim, 12 Drawing Figures

RECORD DISC CUTTING APPARATUS

SUMMARY OF THE INVENTION

This invention relates to a disc recording field. More particularly, this invention relates to a new record disc cutting apparatus.

The applicant of this invention found that, as the result of his deep study as to mechanical behavior of the stylus tip of a reproducing cartridge on the sound track in the form of a groove in a recorded disc, it is possible for the stylus tip per se to move all the directions excluding those of the groove with respect to the engaging point of the tip with the sound track groove of the disc (which point has been called "a moving reference point"). In a conventional 45/45 stereo reproduction system, the movement of the stylus tip is detected by two axes both separated by 45° with respect to the vertical line. Each of these detecting axes is desired to have an ideal sensitivity distribution in the form of the surface of a true sphere having its center point on that axis. Therefore, with such two detecting axes, it is possible to detect all the movement components of the moving tip except those in the direction of the groove engaging the tip with respect to the moving reference point along the detecting axes.

Recently, what is called a matrix recording and reproduction system has been developed, wherein four stereophonic signals are combined with a predetermined mixing ratio to provide two signals, the resulting two signals are recorded and playbacked on and from the disc through the above-mentioned 45/45 stereo recording and reproduction system, and the playbacked two signals are processed through a particular electronical circuitry to provide the original four signals. In that case, it has been discovered that the stylus tip which engages the formed side-wall portions of the groove on the recorded disc can have its movement components in all the directions with respect to the moving reference point of the tip, except those of the groove. The applicant of this invention disclosed, in U.S. application Ser. No. 368,969, the system wherein such movement components of the stylus tip are directly detected from at least three directions to obtain high quality reproduced stereo information.

In accordance with this invention, the cutting apparatus includes a unique support structure for a cutter head. The cutter head comprises a stylus tip for forming a sound groove on a rotating disc to be recorded. The stylus tip is operatively and mechanically driven by a conventional 45—45 drive mechanism comprising left (L) and right (R) drive portions. The cutter head supporting structure is responsive to the driving direction resulting from the driving condition of the L and R drive portions to provide a fulcrum of flexibility for the cutter head. The crosspoint of the driving axes of the L and R drive portions can move in all radial directions in a plane including the driving axes of the L and R drive portions from an inoperative position at the time when neither the L nor the R drive portion receives an input signal. The driving direction at the crosspoint determines the fulcrum position of flexibility for the cutter head. This fulcrum is positioned to continuously move along the length of the cutter head supporting structure when the driving direction at the crosspoint continuously shifts angularly. As the fulcrum moves away from the position at the driving crosspoint, the motion radius of the cutting pointed end of the cutting stylus tip becomes greater. Therefore, the cutting vectors as represented by the motions of said cutting pointed end are distributed in all radial directions when projected onto a plane perpendicular to the cutting pointed end advancing direction on the record disc and including the axis of the stylus tip, said cutting vectors having respective angular deflections from said plane resulting from the respective motion radii of the pointed end of the stylus tip.

In the preferred embodiment of the invention, the supporting structure of the cutter head comprises a suitable flexible material. The supporting structure has two portions of elliptical cross-section, the ellipses of these portions having their major axes which are substantially in right-angled relationship with respect to each other and being jointed to each other by a middle region of circular cross-section. Each portion becomes more flat in elliptical cross-section as it separates from the circular middle region. The end of one of the elliptical portions defines a fulcrum for the pivotal movement in the longitudinal direction of the cutter head resulting from the fact that the input signals to the L and R drive portions are of the same level and phase. At that time, the crosspoint of the driving axes of the L and R drive portions moves in the direction of the axis of the cutting stylus tip. The end of the other elliptical portion defines a fulcrum for the lateral pivotal movement of the cutter head. Also, at this time, the driving crosspoint moves in the direction orthogonal to the axis of the stylus tip. This is because the input signals applied to the L and R drive portions are of the same level and the opposite phase. When the driving crosspoint is moved by means of either the L or the R drive portion, that is, when the resulting vector components of the pointed end of the stylus tip projected onto the plane including the axis of the inoperative stylus tip are angled by 45° with respect to that axis, the fulcrum for the cutter head is positioned at the middle circular region of the supporting flexible structure. This supporting structure is shaped so that as the driving direction at the crosspoint shifts from said 45° directions toward the longitudinal driving direction, the fulcrum position linearly moves from the middle circular region toward a position for the cutter head longitudinal pivotal movement along the length of the supporting structure, and as the driving direction at the crosspoint shifts from said 45° directions toward the lateral driving direction, the fulcrum position also linearly moves from the middle circular region toward a position for the cutter head lateral pivotal movement in the same manner.

Therefore, the cutter head and hence the cutting pointed end of the stylus tip makes cutting movement of the greatest angular deflection from the plane perpendicular to the advancing direction on the disc of the cutting stylus tip and including the axis of the inactive stylus tip in the case of one end fulcrum and cutting movement of the smallest angular deflection from the same plane in the case of the other end fulcrum. These angular deflections linearly correspond to the angular positions from the vertical or horizontal position of the above-mentioned projected vector components of the pointed end of the stylus tip.

In reproduction, at least two different cutting vectors created by the cutting pointed end of the stylus tip may be selected to provide separate detection units having their detection axes corresponding to the number of selected cutting vectors and the special directions thereof. The number of detection axes can be set as needed.

DESCRIPTION OF THE PREFERRED EMBODIMENTS

Figure 1:
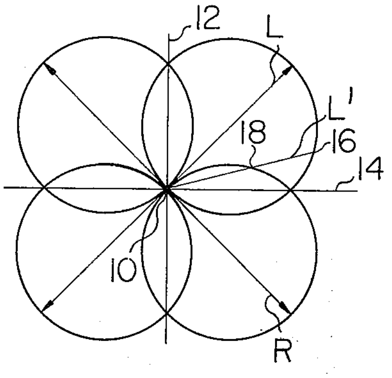
FIG. 1 is a view showing sensitivity distribution of a conventional pickup cartridge having two detection axes arranged with the 45/45 relationship.

FIG. 1 shows sensitivity distribution relating to two detecting axes L and R in a conventional 45—45 stereo cartridge. The axes L and R are arranged with an angular relationship of 90° with respect to the moving reference point 10. Reference numeral 14 identifies by a line a plane parallel with the disc surface, said plane including the moving reference point. Reference numeral 12 identifies by a line another plane perpendicular to the disc surface and also including the moving reference point. The axes L and R make an angle of 45° with respect to the perpendicular plane 12, respectively. The axes are representative of the directions for detecting the movement of the stylus tip with respect to the moving reference point 10. The sensitivity distribution is defined by the surface of a sphere having its center point through which each of the detection axes L and R extends, as is shown in FIG. 1. Therefore, for example, a component of the movement of the tip in the L axis direction is detected by the detection axis L to provide an output corresponding to the ratio of the length of L and a distance from the intersecting point 16 of L′ with the surface of the sphere representative of the sensitivity distribution relating to the detection axis L to the moving reference point 10, and, also, detected by the detection axis R to provide an output corresponding to the ratio of the length of R and a distance from the intersecting point 18 of L′ with the surface of the sphere representative of the sensitivity distribution relating the detection axis R to the moving reference point 10. The movement of the stylus in the directions of the line 12 or 14 is detected by the detection axes L and R to provide the same output, respectively, which is $1/\sqrt{2}$ or −3dB of an output due to the movement in the directions of L or R. That is to say, when these output are stereo-playbacked, the resultant sound localization will appear in a space area intermediate of loudspeakers. The above is a principle as to the two-direction detection of the motion of the stylus tip in the conventional cartridge.

Figure 2:
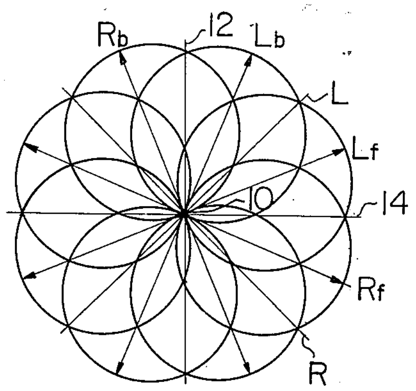
FIGS. 2 and 3 each shows sensitivity distribution of four detection axes arranged in the same plane.

FIG. 2 shows a sensitivity distribution in case where four detection axes each having the sensitivity distribution as shown in FIG. 1 are provided in the same plane to detect the motion of the stylus tip from four directions independently. The detection axes L*f*, L*b*, R*f* and R*b* are arranged to make an angle of 45° between adjacent two axes. In this arrangement, for example, as for the movement component of the stylus in the direction of L*f* axis, the detection axis L*b* detects an output of $1/\sqrt{2}$ of that from the L*f* detection axis. This means that a separation between the adjacent channels is 3dB. That is, if the correspondence of the detection axis L*f* to the detection of a left front sound output and of R*f* and L*b* to the detection of a right front sound output and left back sound output, respectively, is made, the left front sound detected output component will be included in the left back sound and right front sound detected outputs with its reduction in level of 3dB.

Figure 3:
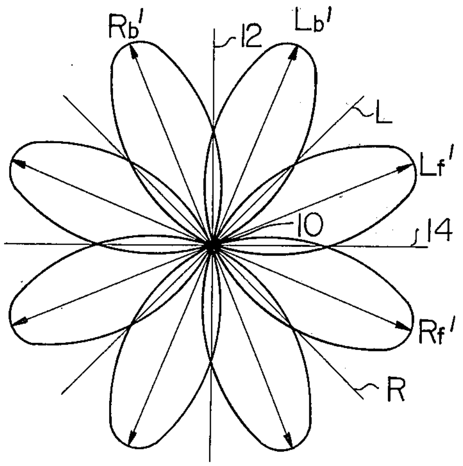

FIG. 3 shows an ideal detection sensitivity distribution provided by a four-channel cartridge wherein each of the detection axes L*f*′, L*b*′, R*f*′ and R*b*′ are in a common plane and has its sensitivity distribution in the form of the surface of an ellipsoid with the longitudinal axis coincided with the detection axis, rather than in the form of the surface of a sphere as in FIGS. 1 and 2. With these cartridges, it is possible to provide a channel separation more than 3dB.

Figure 4:
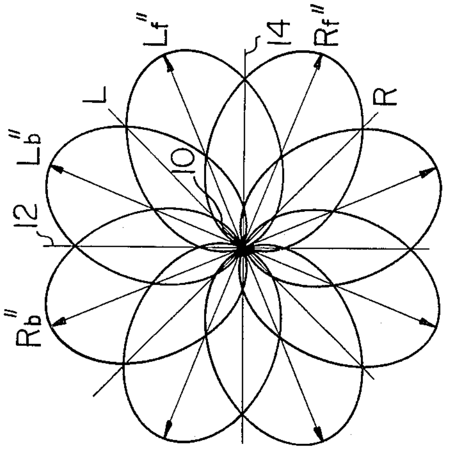
FIG. 4 shows sensitivity distribution of four detection axes arranged three-dimensionally.

FIG. 4 shows an ideal detection sensitivity distribution of another four-channel cartridge wherein the detection axes L*f*″, L*b*″, R*f*″ and R*b*″ which have the same sensitivity distribution as those in FIG. 2 but are arranged to make the angle of 60° between the adjacent detection axes with respect to the moving reference point. Therefore, all of the detection axes are not arranged in the common plane. It can be understood that as the result of the fact that the angle between the adjacent detection axes is made greater, a high channel separation is obtainable in comparison with the plane multi-direction detecting system in FIG. 2. In FIG. 4, the sensitivity distribution of each detection axis is actually in the form of the surface of a sphere, but because all of the detecting axes does not exist in the common plane, they are shown as ellipses. The cartridge such as shown in FIG. 4 can be said "a three-dimensional multi-direction detecting system", whereas the cartridge such as shown in FIG. 2 or 3 is called "a plane multi-direction detecting system".

Figure 5:
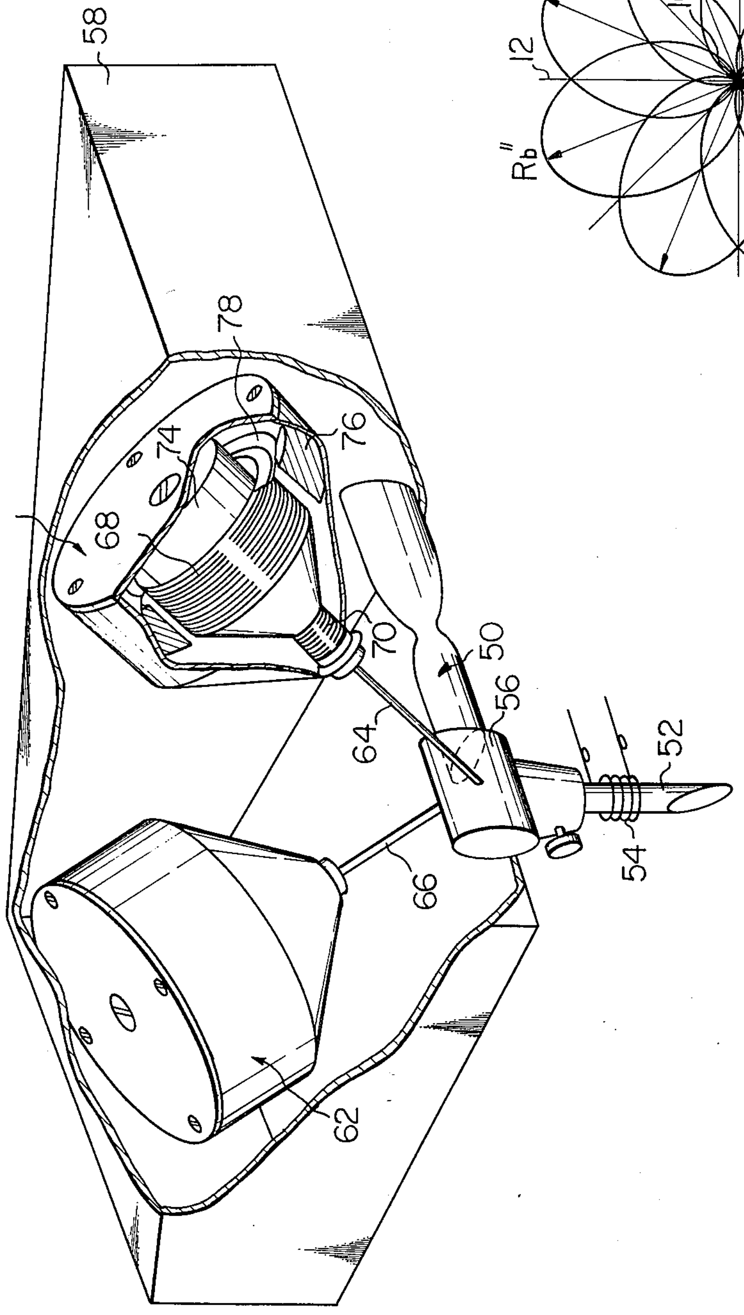
FIG. 5 is a perspective view showing partially in section the cutting apparatus of this invention.
Figure 7:
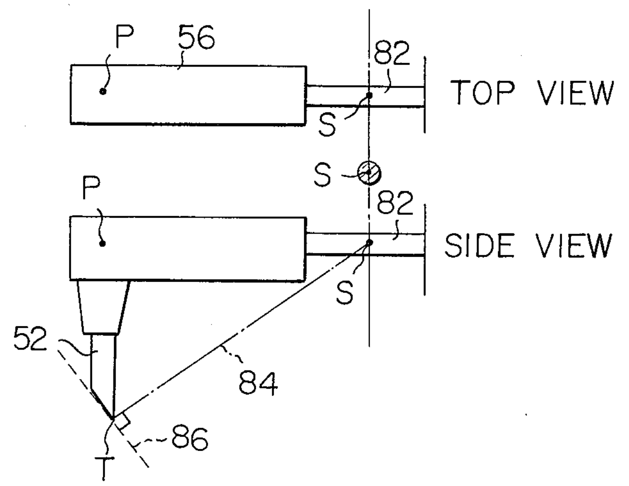
Fig. 7 PRIOR ART
FIG. 7 is an explanatory view showing the operation of a prior art cutter head.

FIG. 5 shows the cutting apparatus according to this invention. This apparatus may be a conventional one, except for the provision of a unique support arm 50 for the cutting head in place of the conventional support arm as shown in FIG. 7. Such unique support arm will be fully described in connection with FIG. 8.

The cutting apparatus comprises a stylus tip 52 for forming a sound groove on a recording disc in the conventional manner. A heater 54 is wound around the tip 52 to heat the latter. The stylus tip 52 is fixed to the frame or housing 58 of the cutting apparatus by means of a stylus supporter 56 and the support arm 50. Thus, the stylus tip is cantilevered with respect to the housing 58.

The stylus tip can be driven by a conventional 45—45 cutting drive mechanism. This cutting drive mechanism comprises a left drive portion 60 and a right drive portion 62, these drive portions being operatively coupled through respective suitable linkages 64 and 66, respectively to the stylus supporter 56 and hence to the stylus tip 52.

Figure 6:
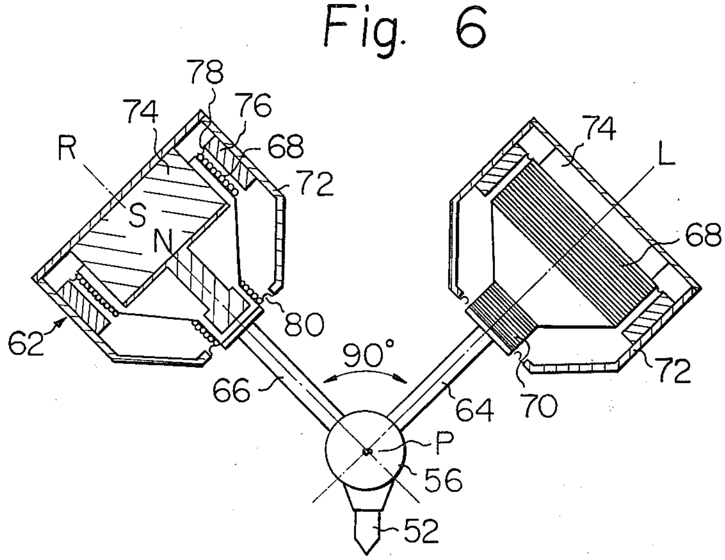
FIG. 6 is a principle view of a conventional 45—45 drive mechanism as used in this invention.

FIG. 6 is a view showing the principle of the 45—45 cutting drive mechanism. Since the left and right drive portions 60 and 62 are the same, only one thereof will be explained hereunder. The linkage 66 has a drive coil 68 and a feedback coil 70. The drive coil 68 is positioned within a gap defined between a cylindrical permanent magnet 74 fixedly mounted on a casing 72 and an annular pole piece 76 also fixedly mounted on the casing 72. It is noted that the drive coil 68, the feedback coil 70 and the linkage 66 move in unit in the direction of the axis of the linkage in response to the driving signal applied to the drive coil. Dampers 78 and 80 act to position the drive coil 68 and the feedback coil in place.

The axial lines of the left and right drive portions 60 and 62 intersect at a point P, which will hereinafter be referred to as a moving intersect point. The linkages 64 and 66 make an angle of 90° with respect to each other.

An electrical driving signal is applied to the respective drive coil to drive the stylus tip 52, and a compensating signal is applied to the respective feedback coil in a known manner.

FIG. 7 is a view explaining the conventional cutting apparatus. It should be noted that the cutting drive mechanism therefor as shown in FIGS. 5 and 6 is deleted from the view. This cutting mechanism has a support arm 82 which may comprise a suitable elastic material and has its cross-section in the form of a circle, as shown. The cutting head comprising the cutter tip 52 which engages a recording disc surface to form a sound groove is cantilevered by the cylindrical support arm 82 to the frame. The cutter head pivots about a fulcrum point S which resides in the substantially middle point of the cylindrical support arm 82, as shown in FIG. 7. It is noted that the point S remains in its position at all times whenever the cutter head is driven by the drive mechanism. Thus, during the cutting movement of the cutter head, the vee end T of the cutter tip 52 runs all over a portion of the surface of the sphere defined by a center point S and a radius of ST (shown by a dash-dot line 84). Since the moving area of the point T from its null position as shown is very small in comparison with the length of the line 84, the point T of the stylus tip may be thought to move in the plane area of T in the null position, which plane area is perpendicular to the line 84. This plane area is identified with reference numeral 86. Therefore, upon receipt of driving forces from the drive mechanism, the stylus tip makes the cutting motion at every angle within the plane area 84 with respect to the cutting tip end null position.

Figure 8:
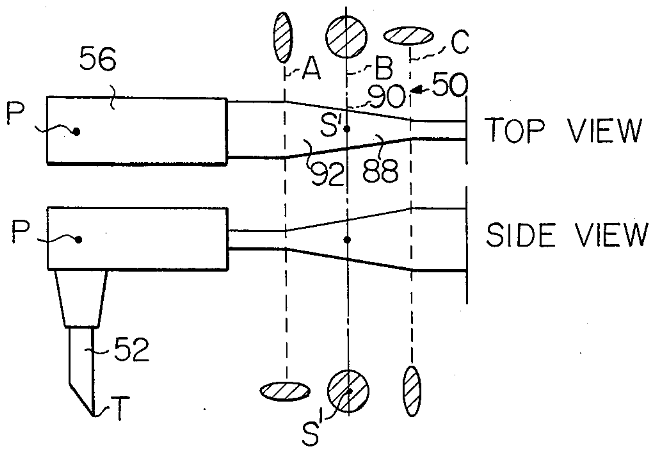
FIG. 8 is a similar explanatory view showing the operation of the cutter head according to this invention.

FIG. 8 is the cutting head according to this invention comprising the unique support arm 50. It should be noted that the conventional 45—45 cutting drive mechanism (FIG. 6) is also applicable to this cutting head. The support arm 50 comprising a suitable flexible material has two portions 88 and 92, each of which has an elliptical cross-section. As is clear from FIG. 8, the portions 88 and 92 are connected with each other at the middle circular portion 90 so that the main axes of the ellipses of the portions 88 and 92 become substantially a right angle. The circular portion 90 is positioned at B which is substantially the middle of the support arm 50. The portion 90 includes at its center a point S' corresponding to the point S in FIG. 7. The portion 92 extends from the circular cross-section portion 90 toward the stylus supporter 56, with the ellipse of the cross-section of the portion 92 varying continuously so that the major axis thereof becomes longer and the minor axis thereof becomes shorter. The portion 88 extends from the circular cross-section 90 toward the frame, with the ellipse of the cross-section of the portion 88 varying continuously so that the major axis thereof becomes longer and the minor axis thereof becomes shorter. Positions A and C define the ends of the portions 92 and 88, respectively.

Figure 9:
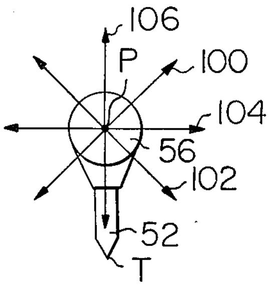
FIG. 9 is a view showing the driving vector distribution at the crosspoint of two driving axes of the drive mechanism of FIG. 6.

FIGS. 9 to 12 show the operation of the cutting mechanism of this invention. FIG. 9 shows the various typical motion vectors of the point P. Vector 100 identifies the moving direction of the point P only at the time when an input signal is applied to the left drive portion 60. Vector 102 identifies the moving direction of the point P only at the time when an input signal is applied to the right drive portion 62. Vector 104 identifies the moving direction of the point P at the time when the L and R input signals applied to the left and right drive portions are of the same phase and the same level. Vector 106 identifies the moving direction of the point P at the time when the L and R input signals are of the opposit phase and the same level.

Figure 10:
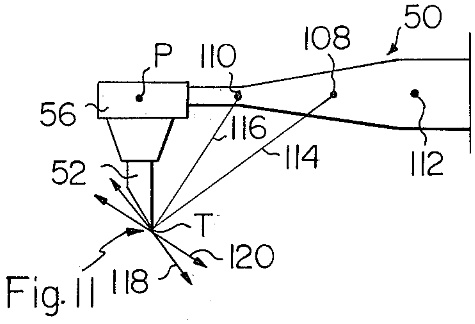
FIG. 10 is a view explaining the fulcrum position shifting operation responsive to the driving direction in accordance with this invention.

FIG. 10 shows into which position the fulcrum of flexibility for the cutter head is to be brought in response to the moving direction of the point P, that is, to the signals to the left and/or right drive portions. The point 110 substantially corresponds to the position A in FIG. 8, and when the fulcrum is brought into this position, the cutter head has the greatest freedom for pivoting in the longitudinal or vertical direction and the smallest freedom for pivoting in the lateral or horizontal direction in FIG. 10. On the other hand, when the fulcrum is brought into the point 112 substantially corresponding to the position C in FIG. 8, the freedom of the cutter head for pivoting in the lateral or horizontal direction is greatest and the freedom of the cutter head for pivoting in the longitudinal or vertical direction is smallest. At the middle point 108 corresponding to the position B or point S in FIG. 8, the freedom of the cutter head for longitudinal or lateral pivoting is equal because of the circular cross-section at that position.

Therefore, the point 110 provides a fulcrum for the cutter head at the time when the point P moves in the vertical direction or the direction 106 in FIG. 9. The point 112 provides a fulcrum at the time when the point P moves in the horizontal direction or the direction 104 in FIG. 9. Since the directions 100 and 102 are separated by 45° or equally with respect to the vertical and horizontal directions, the point 108 in FIG. 10 becomes a fulcrum for the cutter head pivotal movement at the time when the point P moves in these directions.

Consideration will be given in the case where the fulcrum is positioned between the points 108 and 110. As the fulcrum shifts toward the point 110, the freedom of the cutter head for horizontal pivotal movement becomes smaller, whereas the freedom of the cutter head for vertical pivotal movement becomes greater. Therefore, as the moving direction of the point P, that is, the driving direction by means of a 45—45 drive mechanism angularly changes from the direction 100 or 102 to the direction 106 or the vertical direction in FIG. 9, the fulcrum linearly shifts from the point 108 to the point 110. Similarly, as the moving direction of the point P angularly changes from the direction 100 or 102 to the direction 104 or the horizontal direction, the fulcrum linearly shifts from the point 108 to the point 112.

FIG. 10 also shows the fact that, when various fulcrum positions are set between the points 110 and 112, the cutter head takes various pivotal motion radii. It is noted that, in FIG. 10, the point 108 and line 114 correspond to the point S' and line 84 in FIG. 7, respectively. The line 118 in FIG. 10 resides in the plane 86 in FIG. 7. Therefore, along the line 118 perpendicular to the line 114 interconnecting the point 108 with the pointed end T of the stylus tip 52 which is in an inoperative position, the pointed end T moves at the time when the point P (FIG. 9) moves in the directions 100 and 102. The pointed end T moves along the line 120 perpendicular to the line 116 interconnecting the fulcrum 110 with the point T, at the time when the point P moves in the vertical direction 106 (FIG. 9). It should be noted that, in response to the fulcrum position between the points 110 and 112, that is, in response to the driving direction at the point P, the moving directions of the point T with respect to its inoperative position angularly deflect from a plane perpendicular to the advancing direction on the disc of the pointed end T of the stylus tip and including the inoperative axis of the stylus tip.

Figure 11:
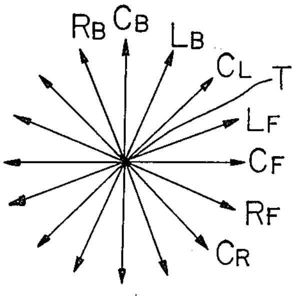
FIG. 11 is a view showing typical projected cutting vectors.
Figure 12:
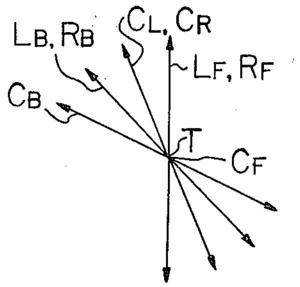
FIG. 12 is a view showing the angular deflections of the typical cutting vectors with respect to a cutting vector projecting plane.

FIG. 11 shows the state of typical motion vectors or cutting vectors projected onto the above plane, and FIG. 12 is a side view showing these vectors. In FIG. 12, vector $C_B$ corresponds to the driving vector 106 in FIG. 9 and the fulcrum position 110 in FIG. 10, and cutting vector $C_F$ to the driving vector 104 and the fulcrum 112. Cutting vectors $C_L$ and $C_R$ correspond to the driving vectors 100 and 102, respectively, and to the fulcrum position 108. Apparently, cutting vectors $L_B$ and $R_B$ correspond to the fulcrum position at the middle point between the points 108 and 110 in FIG. 10, and cutting vectors $L_F$ and $R_F$ to the fulcrum position at the middle point between the points 108 and 112. In FIG. 12, these typical cutting vectors are shown having the above-mentioned respective angular deflections from the cutting vector projected plane in FIG. 11. Since the cutter head rocks at its fulcrum position 112 laterally or horizontally, the vector $C_F$ of the pointed end T is shown in FIG. 12 as a point at the position of T. In FIG. 10, the cutting vector $C_F$ has a direction along a line perpendicular to a line interconnecting the point 112 with the point T.

Accordingly, with the cutting apparatus of this invention as mentioned above, "three-dimensional cutting" can be provided wherein all cutting vectors are distributed three-dimensionally. When this cutting apparatus is used in combination with such a reproduction system as stated in connection with FIG. 4, it is possible to generate a plurality of playback signals with greater interchannel separation. In reproduction, use may be made of eight detection units having their respective detection axes along each of which the maximum sensitibity is obtainable and which are spacially arranged in the directions corresponding to those of the cutting vectors $R_B$, $C_B$, $L_B$, $C_L$, $L_F$, $C_F$, $R_F$ and $C_R$. The playback signals from the detection units corresponding to $R_B$, $C_B$, $L_B$, $C_L$, $L_F$, $C_F$, $R_F$ and $C_B$ are applied through their respective audio amplifiers to respective audio loudspeakers arranged at right back, center back, left back, center left, left front, center front, right front and center right positions with respect to the position of a listener. In four-channel reproduction, even though it is possible to select any four different detection-axis directions within the range of reproduction tracing vectors corresponding to the cutting vector range, it is preferable, from the standpoint of the compatibility with the conventional two channel playback and due to the fact that four speakers can be arranged at the four rectangular corners, to use four specific detection axes corresponding in position to the cutting vectors $L_F$, $R_F$, $R_B$ and $L_B$.

I claim:

1. A record disc cutting apparatus comprising: a cutter head having a cutting stylus tip for forming a sound groove on a rotating record disc, a 45—45 drive mechanism, and means drivingly and mechanically coupling said drive mechanism to said cutter head, said drive mechanism comprising left and right drive portions adapted to drive said cutting head from the respective directions of 45° with respect to the driving vertical axis defined by the inoperative axis of said cutting stylus tip, and means responsive to any driving direction for said cutter head for providing an angularly varying deflection of said pointed end with respect to a plane perpendicular to the advancing direction on the record disc of said cutting stylus tip and including said driving vertical axis, which angularly varying deflection varies with the relative amounts of the motion imparted to said left and right drive portions, said means comprising a flexible support arm for supporting said cutter head in cantilever fashion, said support arm comprising a section of circular cross-section from the opposite sides of which extend portions of elliptical cross-section whose major to minor axis ratio becomes progressively greater proceeding away from said section of circular cross-section and whose major axes are substantially in right-angled relationship with respect to each other, one of said major axes being the same in direction as said cutting vertical axis, said support arm portions forming a line along which said fulcrum is positioned and, as the driving direction changes from said 45° directions toward the vertical driving direction, the fulcrum position linearly shifts from said circular section toward the end of one of said elliptical portions and as the driving direction changes from said 45° directions toward the horizontal driving direction, the fulcrum position linearly shifts from said circular section toward the end of the other elliptical portion.

* * * * *